United States Patent
Sohmshetty et al.

(10) Patent No.: US 10,919,162 B2
(45) Date of Patent: Feb. 16, 2021

(54) SYSTEMS AND METHODS FOR EFFICIENT POWER MANAGEMENT OF MODULAR MOBILE ROBOT PLATFORMS WITH REPLACEABLE BATTERIES

(71) Applicant: Ford Global Technologies, LLC, Dearborn, MI (US)

(72) Inventors: Raj Sohmshetty, Canton, MI (US);
Doug Cantriel, Marietta, GA (US);
Justin Miller, Royal Oak, MI (US);
Kilian Vas, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 16/232,582

(22) Filed: Dec. 26, 2018

(65) Prior Publication Data

US 2020/0206962 A1 Jul. 2, 2020

(51) Int. Cl.
*B25J 19/00* (2006.01)
*B25J 5/00* (2006.01)
(Continued)

(52) U.S. Cl.
CPC .............. *B25J 19/005* (2013.01); *B25J 5/007* (2013.01); *B25J 9/162* (2013.01); *B60S 5/06* (2013.01);
(Continued)

(58) Field of Classification Search
CPC .......... B25J 19/005; B25J 5/007; B25J 9/162; B60S 5/06; H02J 3/322; H02J 7/0013;
(Continued)

(56) References Cited

U.S. PATENT DOCUMENTS 7,620,437 B2 * 11/2009 Reggiardo ........... A61B 5/0002
204/412
8,618,766 B2 * 12/2013 Anderson ............. B60L 53/305
320/101
(Continued)

FOREIGN PATENT DOCUMENTS

WO 2018/154594 A1 8/2018

OTHER PUBLICATIONS

Battery Swapping System (2 pages). Retrieved from http://www.aleees.com/en/component/k2/item/319-electricity.html.
(Continued)

*Primary Examiner* — M Baye Diao
(74) *Attorney, Agent, or Firm* — Brandon Hicks; Eversheds Sutherland (US) LLP

(57) ABSTRACT

Systems and methods for swapping mobile robot batteries on battery charging stations are disclosed herein. An example system may comprise at least one mobile robot, wherein the mobile robot may be optionally coupled to a modular component, and wherein the mobile robot and the modular component may each have robot batteries configured to be detachably removed from the mobile robot and the modular component. An example system may also comprise at least one battery charging station for receiving robot or modular component batteries for charging, and also for providing charged batteries to mobile robots or modular components. Finally, the system may comprise a service provider and a network that may be used to manage data and handle interactions between the mobile robots and the battery charging stations.

16 Claims, 7 Drawing Sheets

(51) Int. Cl.
*H02J 7/00* (2006.01)
*B25J 9/16* (2006.01)
*B60S 5/06* (2019.01)

(52) U.S. Cl.
CPC .......... *H02J 7/0027* (2013.01); *H02J 7/0045* (2013.01); *B64C 2201/066* (2013.01)

(58) Field of Classification Search
CPC ...... H02J 7/0014; H02J 7/0016; H02J 7/0018; H02J 7/0019; H02J 7/0024; H02J 7/0025; H02J 7/0042; H02J 7/0044; H02J 7/0045; H02J 2310/22; H02J 2310/40; H02J 2310/42; H02J 2310/44; H02J 2310/46; H02J 2310/48; H02J 7/0027; B64C 2201/066
USPC ........................................................ 320/109
See application file for complete search history.

(56) References Cited

U.S. PATENT DOCUMENTS

| | | | | |
|---|---|---|---|---|
| 8,918,950 | B2* | 12/2014 | Song | A47L 5/225 |
| | | | | 15/319 |
| 8,922,163 | B2* | 12/2014 | Macdonald | A47F 10/00 |
| | | | | 320/109 |
| 9,776,326 | B2* | 10/2017 | Zevenbergen | B25J 9/1664 |
| 9,868,421 | B2* | 1/2018 | Hassounah | B60L 53/80 |
| 10,054,950 | B2* | 8/2018 | Carrasco Zanini | H02J 50/10 |
| 10,105,845 | B1* | 10/2018 | Jackowski | B25J 9/1617 |
| 2004/0067411 | A1* | 4/2004 | Lisanke | H02J 7/0045 |
| | | | | 429/90 |
| 2010/0181129 | A1 | 7/2010 | Hamidi | |
| 2012/0248868 | A1 | 10/2012 | Mobin et al. | |
| 2013/0081245 | A1 | 4/2013 | Vavrina et al. | |
| 2018/0104829 | A1 | 4/2018 | Altman et al. | |
| 2019/0070995 | A1* | 3/2019 | Cantrell | B64F 1/222 |
| 2019/0189981 | A1* | 6/2019 | Neumann | A47L 11/4002 |
| 2020/0076205 | A1* | 3/2020 | Luo | H01M 10/425 |

OTHER PUBLICATIONS

Wu, et al., "Automatic Battery Swap System for Home Robots," International Journal of Advanced Robotic Systems, 2012, vol. 9, 255:2012, pp. 1-9. https://doi.org/10.5772/54025.

* cited by examiner

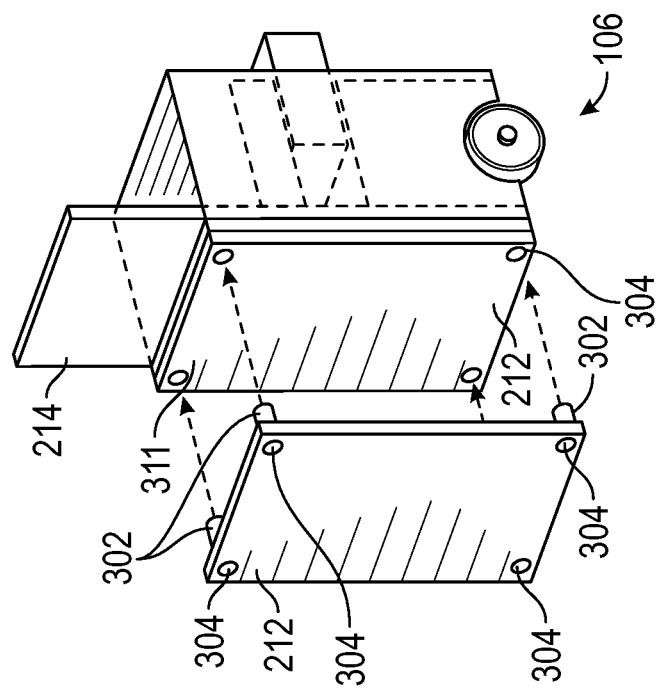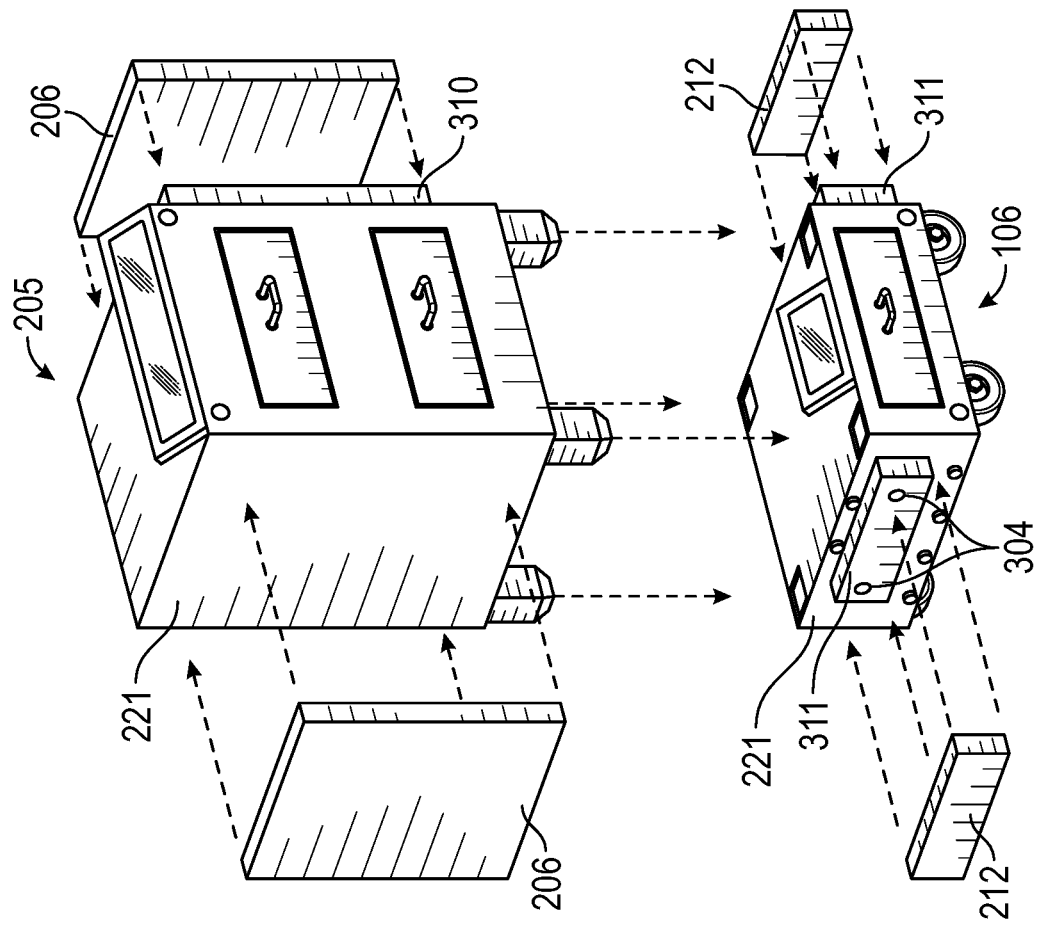
FIG. 3

SYSTEMS AND METHODS FOR EFFICIENT POWER MANAGEMENT OF MODULAR MOBILE ROBOT PLATFORMS WITH REPLACEABLE BATTERIES

FIELD OF THE DISCLOSURE

The disclosure generally relates to mobile robots, and more particularly relates to power management and range optimization of sidewalk delivery and other similar mobile robots using swappable batteries and battery charging stations.

BACKGROUND

Autonomous mobile robot delivery systems are becoming a more prevalent solution for a number of applications, primarily in the realm of package delivery. Using mobile robots to perform the last portion of the delivery journey increases delivery efficiency because they reduce some logistical concerns that accompany deliveries in urban areas (e.g., lack of parking and traffic congestion). However, one difficulty in implementing a system including mobile robot delivery units is the need to power the mobile robots through batteries with potential range limitations and long charge times. The mobile robot battery being a limiting factor also increases route complexity, because the robots have to take into account their limited range when making deliveries.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 depicts an example of how robot batteries are coupled to a mobile robot in accordance with one or more embodiments of the disclosure.

DETAILED DESCRIPTION

Overview

Figure 1:
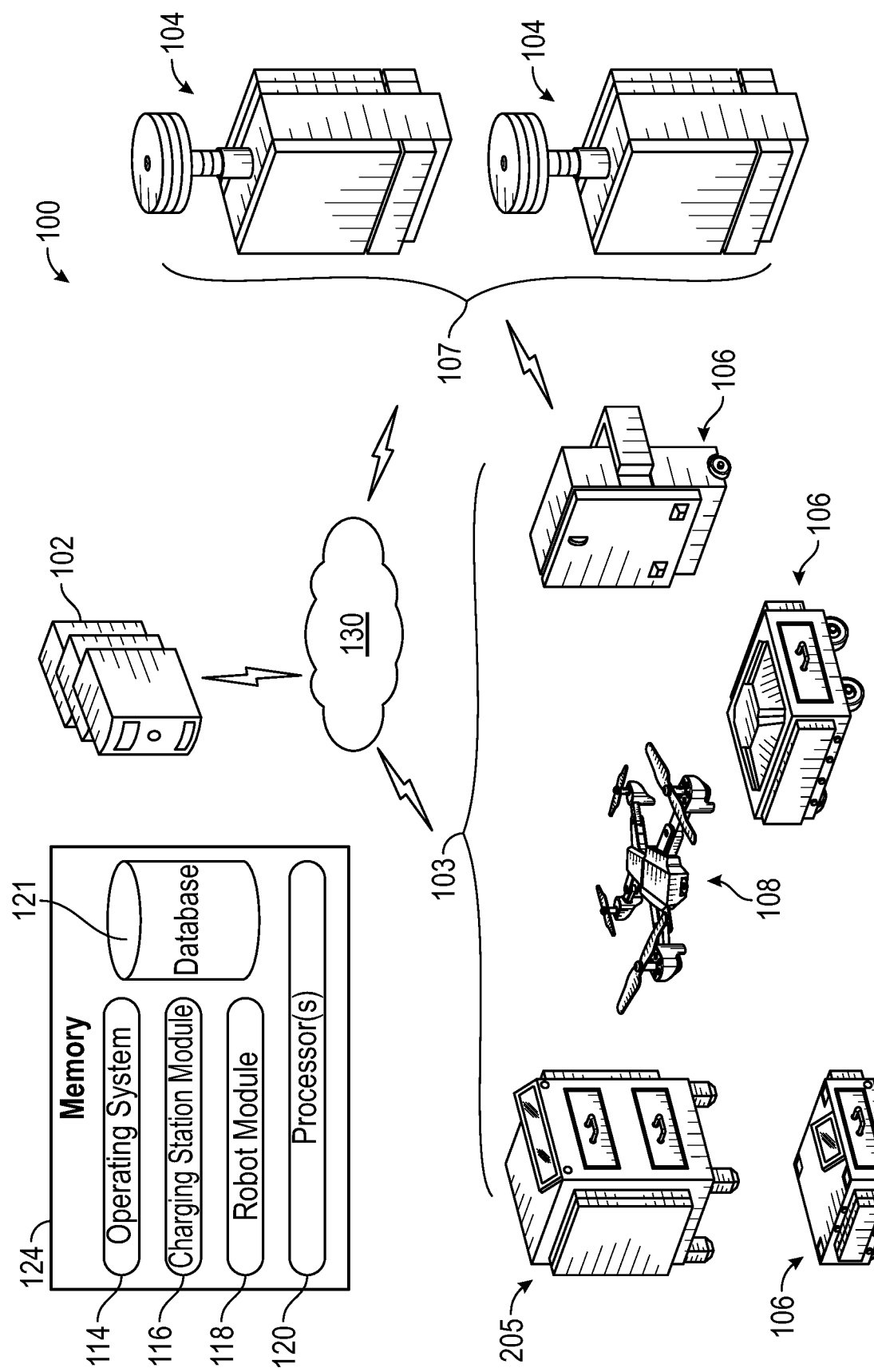
FIG. 1 depicts an illustrative robot battery exchange system in accordance with one or more embodiments of the disclosure.

The disclosure is related to systems and methods for exchanging robot batteries between at least one mobile robot and at least one battery charging station. In a particular embodiment, the systems and methods described herein pertain to sidewalk delivery robots exchanging robot batteries with a depleted charge for robot batteries with a full or fuller charge located at a battery charging station disposed within a geographic location, such as an urban environment or elsewhere. This allows the mobile robots to replace or "swap" their depleted batteries with charged batteries to extend their delivery range without having to stop and wait for their batteries to charge.

Generally, the system may comprise at least one mobile robot and at least one battery charging station. A mobile robot may comprise at least one robot battery which is configured to be detachably removed from the mobile robot. In some embodiments, the mobile robot may comprise multiple robot batteries that are mechanically and/or electrically coupled together and to the mobile robot. Some of the robot batteries in these embodiments may be configured to be detachably removed from the mobile robot, while some of the robot batteries may be configured to be permanently affixed to the mobile robot. In various embodiments, the robot batteries provide power to the mobile robot as the mobile robot traverses a geographic area, such as an urban environment or elsewhere. In some embodiments, the robot batteries may be located on the external body of the mobile robot. In such instances, the robot batteries may be externally accessible. That is, the robot batteries may be disposed on and accessible about an exterior of the mobile robot. In other embodiments, the robot batteries may be located on the internal portion of the mobile robot.

In various embodiments, a mobile robot may be configured to provide a robot battery to a battery charging station. The mobile robot may also be configured to subsequently receive a robot battery from the battery charging station. This may allow the mobile robot to quickly exchange, at the battery charging station, a robot battery with less than a full charge for a robot battery with a full or fuller charge than the battery provided to the battery charging station by the mobile robot. By doing so, the provided robot battery may be charged by the battery charging station for use by another mobile robot or the same mobile robot, and the mobile robot may immediately continue along its route with the charged battery it received from the battery charging station. In some embodiments, the mobile robot may also be configured to rearrange robot batteries located on a battery charging station so as to locate a robot battery on the battery charging station that has sufficient charge for the mobile robot to use (for example, if there are multiple robot batteries stacked together on the battery charging station).

In various embodiments, the system may also comprise a modular component configured to be coupled to the mobile robot. The modular component may comprise at least one modular component battery which is configured to be detachably removed from the modular component. In some embodiments, the modular component may comprise multiple modular component batteries that are mechanically and/or electrically coupled together and to the modular component. Some of the modular component batteries in these embodiments may be configured to be detachably removed from the modular component, while some of the modular component batteries may be configured to be permanently affixed to the modular component. In various embodiments, the modular component batteries provide power to the modular component, and/or the mobile robot coupled to the modular component, as the modular component and coupled mobile robot traverse a geographic area, such as an urban environment or elsewhere. In some embodiments, the modular component batteries may be located on the external body of the modular component. In such instances, the modular component batteries may be externally accessible. That is, the modular component batteries may be disposed on and accessible about an exterior of the modular component. In other embodiments, the modular component batteries may be located on the internal portion of the modular component. In some embodiments, the modular component may also be configured to exchange modular component batteries with the battery charging station.

In various embodiments, a battery charging station may generally comprise a base, one or more battery charging ports, and one or more ancillary devices, such as displays, speakers, microphones, lights, etc., for providing features such as informational display text, audible instructions, or lighting in the general vicinity surrounding the battery charging station. A battery charging station may also be optionally configured to be mobile and traverse the surrounding geographic area. The advantage of this mobile configuration may be that the battery charging station is able to move towards a mobile robot, which is especially helpful in a scenario where a mobile robot does not have enough power to reach a battery charging station. In some embodiments, one or more battery charging ports of the battery charging station may be configured to receive robot batteries, and may also be configured to thereafter begin providing power and charging the received robot batteries. The battery charging ports may be located on only one side of the battery charging station, may be located on multiple sides of the battery charging station (e.g., on opposite sides), or may be located on all sides of the battery charging station (e.g., front, back, and sides). The battery charging ports may be configured to electrically and/or mechanically couple to the robot batteries provided to the battery charging station by a mobile robot, and may also be configured to receive more than one robot battery at one battery charging port, forming a battery stack on the battery charging port. The received robot batteries may be of various sizes, and various battery charging ports may be configured to receive specific battery sizes/types, or may be configured to receive any size/type of battery (e.g., the battery charging port could also receive one or more modular component batteries).

In some embodiments, a service provider may also be in communication with at least one mobile robot and/or at least one battery charging station. The service provider may coordinate interactions between any of the mobile robots and any of the battery charging stations, between any of the mobile robots themselves, or between any of the battery charging stations themselves. The service provider may actively provide instructions to a mobile robot or a battery charging station, or may perform more passive operations, such as merely providing data to a mobile robot or a battery charging station. In more specific embodiments, the service provider may provide logistical information to a mobile robot, including optimal delivery routes, locations of battery charging stations, and other useful data and/or instructions. In other embodiments, a mobile robot and a battery charging station may communicate or interact independently of the service provider.

Illustrative Architecture

Turning now to the drawings, FIG. 1 depicts an illustrative architecture 100 for a robot battery exchange system in which techniques and structures for providing the systems and methods disclosed herein may be implemented. The illustrative architecture 100 may include a service provider 102, one or more networks 130, at least one battery charging station 107, and at least one mobile robot 103. In some instances, the at least one battery charging station 107 may comprise a plurality of battery charging stations 104. Similarly, the at least one mobile robot 103 may comprise a plurality of mobile robots 106. It should be noted that while some of the following descriptions only reference mobile robots 106, the same could apply to unmanned aerial vehicles 108, modular components 205, or any other type of robot. Example mobile robots 106 and battery charging stations 104 are disclosed in greater detail in PCT Application Serial Number PCT/US2018/042943, filed on Jul. 19, 2018, titled "Swappable Battery System", which is hereby incorporated by reference herein in its entirety including all references and appendices cited therein for all purposes.

In some embodiments, all of the various components (e.g., the at least one battery charging station 107, the at least one mobile robot 103, etc.) may interact with one another directly and/or over one or more networks 130. For example, in some instances, all of the various components may access, receive from, transmit to, or otherwise interact with one another directly and/or over the networks 130 to facilitate the exchange of one or more robot batteries 212 between a mobile robot 106 and a battery charging station 104.

The networks 130 may include any one or a combination of multiple different types of networks, such as cable networks, the Internet, wireless networks, and other private and/or public networks. In some instances, the networks 130 may include Bluetooth, cellular, near-field communication (NFC), Wi-Fi, or Wi-Fi direct. It is also noted that the described techniques may apply in other client/server arrangements (e.g., set-top boxes, etc.), as well as in non-client/server arrangements (e.g., locally stored software applications, etc.).

In some embodiments, the service provider 102 may be a computing system comprising one or more processors 120, a robot module 118, a battery charging station module 116, an operating system 114, a memory 124, and a database 121. In one embodiment, the service provider 102 may coordinate communications and interactions between the battery charging station 104 and the mobile robot 106. The service provider 102 may communicate directly with the mobile robot 106 or the battery charging station 104, or may communicate with the mobile robot 106 or the battery charging station 104 through a third party. In some embodiments, the battery charging station 104 and the mobile robot 106 may also be in direct communication with one another.

The memory 124 can comprise functionality instructions storage and functionality information storage. The functionality instructions storage can comprise computer-accessible instructions that, in response to execution (by at least one of the processor(s) 120), can implement one or more of the functionalities of the disclosure. The computer-accessible instructions can embody or can comprise one or more software components illustrated as power control component(s). In one scenario, execution of at least one component of the power control component(s) can implement one or more of the techniques disclosed herein. For instance, such execution can cause a processor that executes the at least one component to carry out a disclosed example method. It should be appreciated that, in one aspect, a processor of the processor(s) 120 that executes at least one of the power control component(s) can retrieve information from or retain information in a memory element (referred to as power control information) in the functionality information storage in order to operate in accordance with the functionality programmed or otherwise configured by the power control component(s). Such information can include at least one of code instructions, information structures, or the like. At least one of the one or more interfaces (e.g., application programming interface(s)) can permit or facilitate the communication of information between two or more components within the functionality instructions storage. The information that is communicated by the at least one interface can result from implementation of one or more operations in a method of the disclosure. In certain embodiments, one or more of the functionality instructions storage and the functionality information storage can be embodied in or can comprise removable/non-removable, and/or volatile/non-volatile computer storage media.

At least a portion of at least one of the power control component(s) or power control information can program or otherwise configure one or more of the processors 120 to operate at least in accordance with the functionality described herein. One or more of the processor(s) 120 can execute at least one of such components and leverage at least a portion of the information in the functionality information storage in order to provide power control in accordance with one or more aspects described herein.

It should be appreciated that, in certain scenarios, the functionality instruction(s) storage can embody or can comprise a computer-readable non-transitory storage medium having computer-accessible instructions that, in response to execution, cause at least one processor (e.g., one or more of the processor(s) 120) to perform a group of operations comprising the operations or blocks described in connection with the disclosed methods.

The memory 124 can comprise computer-accessible instructions and information (e.g., data and/or metadata) that permit or facilitate the operation and/or administration (e.g., upgrades, software installation, any other configuration, or the like) of the computing device. Accordingly, as illustrated, the memory can comprise a memory element (labeled OS instruction(s)) that contains one or more program modules that embody or include one or more operating systems, such as Windows operating system, Unix, Linux, Symbian, Android, Chromium, and substantially any operating system suitable for mobile computing devices or tethered computing devices. In one aspect, the operational and/or architectural complexity of the computing device can dictate a suitable operating system. The memory 124 also comprises a system information storage having data and/or metadata that permits or facilitates the operation and/or administration of the computing device. Elements of the OS instruction(s) and the system information storage can be accessible or can be operated on by at least one of the processor(s) 120.

The battery charging station module 116 may be configured to coordinate the functionality of a battery charging station 104. In some embodiments, the battery charging station module 116 may provide instructions to the battery charging station 104, whereas in other embodiments the battery charging station module 116 may assume a more passive role and merely provide data to the battery charging station 104 upon request. For example, the battery charging station module 116 may provide information to the battery charging station 104 about the status of various mobile robots 106 in the vicinity.

The robot module 118 may be configured to coordinate the functionality of a mobile robot 106. In some embodiments, the robot module 118 may provide instructions to a mobile robot 106, whereas in other embodiments the robot module 118 may assume a more passive role and merely provide data to a mobile robot 106 upon request. For example, the robot module 118 may provide information to a mobile robot 106 about the status and location of various battery charging stations 104 in the vicinity. As another example, the robot module 118 may provide route instructions to a mobile robot 106.

Figure 2:
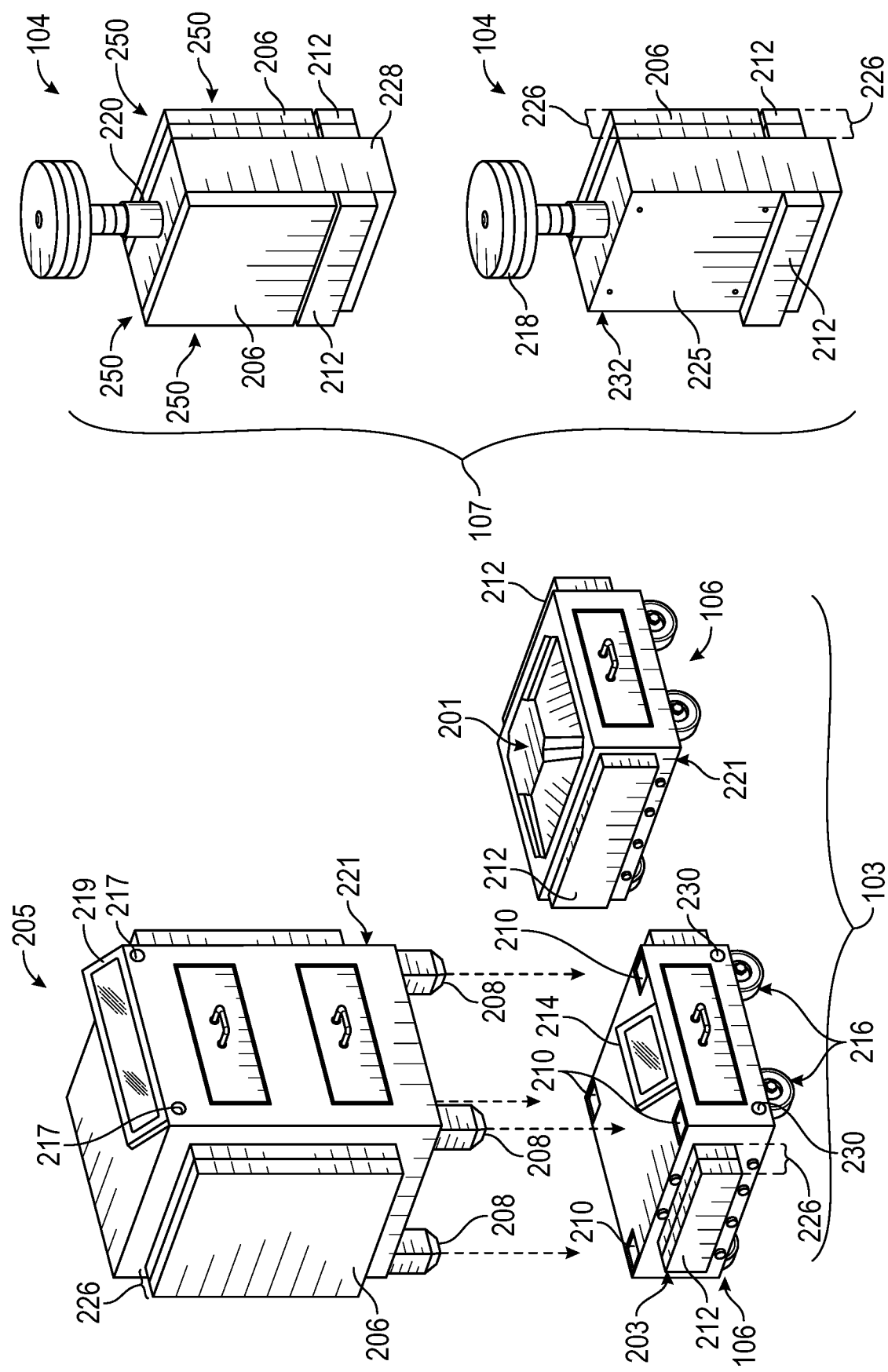
FIG. 2A depicts exemplary mobile robots and an exemplary accompanying modular component of a mobile robot in accordance with one or more embodiments of the disclosure.
FIG. 2B depicts an exemplary battery charging station in accordance with one or more embodiments of the disclosure.

FIG. 2A depicts an exemplary mobile robot 106 and an accompanying modular component 205. In some embodiments, the mobile robot 106 may comprise mobile robot movement apparatus 216 used to move the mobile robot from one location to another. The mobile robot apparatus 216 may be any movement apparatus such as wheels, tracks, or mechanical legs coupled to an actuator, such as an electric motor. The mobile robot 106 may also comprise a mobile robot display 214. The mobile robot display 214 may be optionally configured to display various types of information such as battery charge information, information regarding the contents of the mobile robot 106 (e.g., packages being delivered), or any other relevant information. In some embodiments, the mobile robot display 214 may also be optionally configured to receive user input, for example, to provide a password to unlock a holding container located internally 201 to the mobile robot 106 to access package delivery contents from within the mobile robot 106, in one example. In further embodiments, the mobile robot 106 may comprise one or more mobile robot sensors 230 that are affixed to the mobile robot 106. As example illustrations, the sensors may be any one of infrared sensors, ultrasonic sensors, pressure sensors, accelerometers, or any other sensor capable of receiving an input from the environment. In some embodiments, the mobile robot sensors 230 on the mobile robot 106 may be configured to receive inputs from the environment to determine how to traverse the environment. The mobile robot sensors 230 may also be used to receive inputs from a battery charging station 104. Although the mobile robot sensors 230 are depicted as being affixed to one particular side of the mobile robot 106 illustrated in FIG. 2A, it should be noted that the mobile robot sensors 230 may be affixed to any part of the mobile robot 106.

A mobile robot 106 and a battery charging station 104 may be configured to communicate with each other directly or over a network by way of one or more communications antennas. A communications antenna may be any suitable type of antenna corresponding to the communications protocols used by the mobile robot 106 and the battery charging station 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the mobile robot 106 and the battery charging station 104.

The mobile robot 106 and/or the battery charging station 104 may include any suitable radio and/or transceiver for transmitting and/or receiving radio frequency (RF) signals in the bandwidth and/or channels corresponding to the communications protocols utilized by the mobile robot 106 and/or the battery charging station 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

A mobile robot 106 may also comprise at least one robot battery 212 configured to provide power to the mobile robot 106. A robot battery 212 may be situated either internally 201 to the mobile robot 106 or on the external body 221 (as depicted in the illustrative example in FIG. 2A) of the mobile robot 106. Situating the robot battery 212 on the external body 221 of the mobile robot 106 provides for additional space within the mobile robot 106 for storing various items (e.g., delivery packages). In addition, situating the robot battery 212 on the external body 221 of the mobile robot 106 provides easy access to the robot battery 212 and enables the robot battery 212 to be more easily replaced or "swapped" out at the battery charging station 104.

A robot battery 212 may also be configured to be detachable from a mobile robot 106. In various embodiments, a mobile robot 106 may comprise more than one robot battery 212, with, in some instances, one robot battery 212 being permanently coupled to a mobile robot 106 and one robot battery 212 being configured to be detachable from a mobile robot 106. This would allow the mobile robot 106 to continue operations while replacing or "swapping" a robot battery 212 with a battery charging station 104. A detachable robot battery 212 may be swappable with another robot battery 212 located on a battery charging station 104. In other embodiments, all of the robot batteries 212 located on a mobile robot 106 may be configured to be detachable from the mobile robot 106. The robot batteries 212 may also be configured to be mechanically and/or electrically coupled to other robot batteries 212 so as to form battery stacks 226 on a mobile robot 106. Each of the robot batteries 212 within a battery stack 226 may provide power to any of the other robot batteries 212 within the battery stack 226 and/or the mobile robot 106.

In some embodiments, the mobile robot 106 may be coupled to a modular component 205. The modular component 205 may comprise at least one modular component battery 206. A modular component battery 206 may be situated either internally 201 to the modular component 205 or on the external body 221 (as depicted in the illustrative example in FIG. 2A) of a modular component 205. Situating the modular component battery 206 on the external body 221 of the modular component 205 provides for additional space within the modular component 205 for storing various items (e.g., delivery packages). In addition, situating the modular component battery 206 on the external body 221 of a modular component 205 provides easy access to the modular component battery 206 and enables the modular component battery 206 to be more easily replaced or "swapped" out at the charging station. The modular component battery 206 may also be configured to be detachable from the modular component 205. In various embodiments, the modular component 205 may comprise more than one modular component battery 206 with one modular component battery 206 being permanently coupled to a modular component 205 and a second modular component battery 206 being configured to be detachable from a modular component 205. The detachable modular component battery 206 may be replaceable or "swappable" with another modular component battery 206 located on a battery charging station 104. In other embodiments, all of the modular component batteries 206 located on a modular component 205 may be configured to be detachable from the modular component 205. The modular component battery 206 may also be configured to be mechanically and/or electrically coupled to other modular component batteries 206 so as to form battery stacks 226. Each modular component battery 206 within a battery stack 226 may provide power to any of the other modular component batteries 206 within the battery stack 226 and/or the modular component 205.

A modular component 205 may also comprise one or more modular component displays 219. A modular component display 219 may be optionally configured to display various types of information such as battery charge information, information regarding the contents of the modular component 205 (e.g., packages being delivered), or any other relevant information. In some embodiments, the modular component displays 219 may also be optionally configured to receive user input, for example, to provide a password to unlock a holding container of a modular component 205 to access package delivery contents from within the modular component 205. In further embodiments, a modular component 205 may comprise one or more modular component sensors 217 that are affixed to the modular component 205. As example illustrations, the sensors may be any one of infrared sensors, ultrasonic sensors, pressure sensors, accelerometers, or any other sensor capable of receiving an input from the environment. In some embodiments, the modular component sensors 217 on the modular component 205 may be configured to receive inputs from the environment to determine how to traverse the environment. The modular component sensors 217 may also be used to receive inputs from a battery charging station 104.

In some embodiments, a modular component 205 and a mobile robot 106 may be mechanically and/or electrically coupled. The modular component 205 and the mobile robot 106 may be coupled through at least one modular component coupling protrusion 208 and at least one mobile robot coupling slot 210. There may be any number of modular component coupling protrusions 208 and mobile robot coupling slots 210 located on the modular component 205 and the mobile robot 106 respectively. The modular component coupling protrusions 208 may be mechanically and/or electrically coupled to the mobile robot coupling slots 210 through any number of various mechanical or electrical fixing mechanisms. In other embodiments, the modular component 205 may contain the mobile robot coupling slots 210 and the mobile robot 106 may contain the modular component coupling protrusions 208. In even further embodiments, the modular component 205 and the mobile robot 106 may be mechanically and/or electrically coupled without the use of protrusions and slots.

In various embodiments, once a modular component 205 and a mobile robot 106 are mechanically and/or electrically coupled, both a modular component battery 206 and a robot battery 212 may provide power to either the modular component 205 or the mobile robot 106, or both the modular component 205 and the mobile robot 106. A modular component battery 206 and a robot battery 212 may be of various sizes, or may be the same size.

FIG. 2B depicts an exemplary battery charging station 104. The battery charging station 104 may comprise a base 228, at least one battery charging station port 225 configured to receive and charge batteries, and an ancillary device 220. In some embodiments, the battery charging station 104 may also comprise at least one modular component battery 206, at least one robot battery 212, and at least one unmanned aerial vehicle battery 218. In some embodiments, a battery charging station 104 may also comprise one or more battery stacks 226 if more than one robot battery 212 is coupled to any given battery charging station port 225. In some embodiments, a battery charging station 104 or a battery stack 226 may only comprise one type of battery, or any combination of any of the aforementioned batteries (e.g. only robot batteries 212, or robot batteries 212 and unmanned aerial vehicle batteries 218, etc.).

In some embodiments, the battery charging station base 228 may be affixed to its surrounding environment and thus immobile. In other embodiments, the base 228 may be immobile, but not affixed to the environment. In even further embodiments, the base 228 may comprise any apparatus used to move the battery charging station 104 from one location to another. For example, the base 228 may be equipped with wheels, tracks, or mechanical legs coupled to an actuator (e.g., an electric motor) to allow the battery charging station 104 to travel towards a mobile robot 106, or in any other general direction.

In some embodiments, the battery charging station 104 is configured to receive one or more modular component batteries 206, robot batteries 212, and/or unmanned aerial vehicle batteries 218. In other embodiments, the battery charging station 104 may be configured to receive any other type of battery. The battery charging station 104 may receive the one or more modular component batteries 206, robot batteries 212, unmanned aerial vehicle batteries 218, or any other type of battery at one or more battery charging station ports 225. The battery charging station ports 225 may be configured to receive a specific type of battery, such as the aforementioned robot battery 212 and/or the modular component battery 206, or may be configured to receive any combination of different types of batteries. In some embodiments, the battery charging station ports 225 may be configured so that batteries used for particular types of mobile robots 106 are located at a position that allows for that particular type of robot to easily access the battery (as depicted in FIG. 4 where mobile robots 106 with various battery sizes easily align with the robot batteries 212 located on the exemplary battery charging station 104).

In various embodiments, the battery charging station ports 225 may be mechanically and/or electrically coupled to a received battery (e.g., a modular component battery 206, a robot battery 212, an unmanned aerial vehicle battery 218, or any other type of battery) and may provide power to the received battery, thus charging the battery while the battery is coupled to the battery charging station port 225. In some embodiments, the battery charging station ports 225 may be configured to receive more than one battery. The battery charging station ports 225 may receive multiple batteries to form a battery stack 226 comprising any combination of the aforementioned batteries or any other type of battery. The batteries comprising a battery stack 226 may be electrically and/or mechanically coupled together so that the battery charging station ports 225 may provide power to any number of the batteries in the battery stack 226 at the same time.

In some embodiments, the battery charging station 104 may be configured to receive batteries on any given number of battery charging station sides 250 of the battery charging station 104. For example, a battery charging station 104 may comprise battery charging station ports 225 on only two sides of the battery charging station 104. The two battery charging station ports 225 may be on opposite sides of the battery charging station 104, as depicted in FIG. 2B. In other embodiments, the two battery charging station ports 225 may be located on adjacent sides of the battery charging station 104. In further embodiments, there may be only one battery charging station port 225 located on any given side of a battery charging station 104. In even further embodiments, there may be any given number of battery charging station sides 250 comprising any given number of battery charging station ports 225. In some embodiments, a battery charging station 104 may be configured to rearrange batteries from one battery charging station side 250 to another.

FIG. 3 illustrates an example of robot battery 212 (or modular component battery 206) configurations for coupling to a mobile robot 106 and/or a modular component 205. Such configurations are disclosed in greater detail in PCT Application Serial Number PCT/US2018/042943, filed on Jul. 19, 2018, titled "Swappable Battery System", which is hereby incorporated by reference herein in its entirety including all references and appendices cited therein for all purposes. In some embodiments (as depicted in FIG. 4), the robot batteries 212 or the modular component batteries 206 may be coupled to the external body 221 of the mobile robot 106 or the modular component 205. In other embodiments, the robot batteries 212 or the modular component batteries 206 may also be coupled internally 201 to the mobile robot 106 or the modular component 205. The robot batteries 212 or the modular component batteries 206 may also be coupled to a second mobile robot battery 311 or a second modular component battery 310 (to form one or more battery stacks 226) if the second mobile robot battery 311 or the second modular component battery 310 is already coupled to the mobile robot 106 or the modular component 205. The robot batteries 212 or the modular component batteries 206 may be coupled to a mobile robot 106, the modular component 205, or a second mobile robot battery 311 or second modular component battery 310 through various battery connector protrusions 302 and battery connector holes 304 located on the mobile robot batteries 212 or the modular component batteries 206. The mobile robot batteries 212 or the modular component batteries 206 may be configured to mechanically and/or electrically couple to the mobile robot 106, the modular component 205, or the second mobile robot battery 311 or the second modular component battery 310, so that once coupled, the robot batteries 212 or the modular component batteries 206 may provide power to the mobile robot 106 or the modular component 205. It should be noted that although the description of FIG. 3 provided herein references mobile robots 106, robot batteries 212, modular components 205, and modular component batteries 206, the same configurations may apply to any other types of robots or robot batteries (e.g., an unmanned aerial vehicle 108).

Figure 4A:
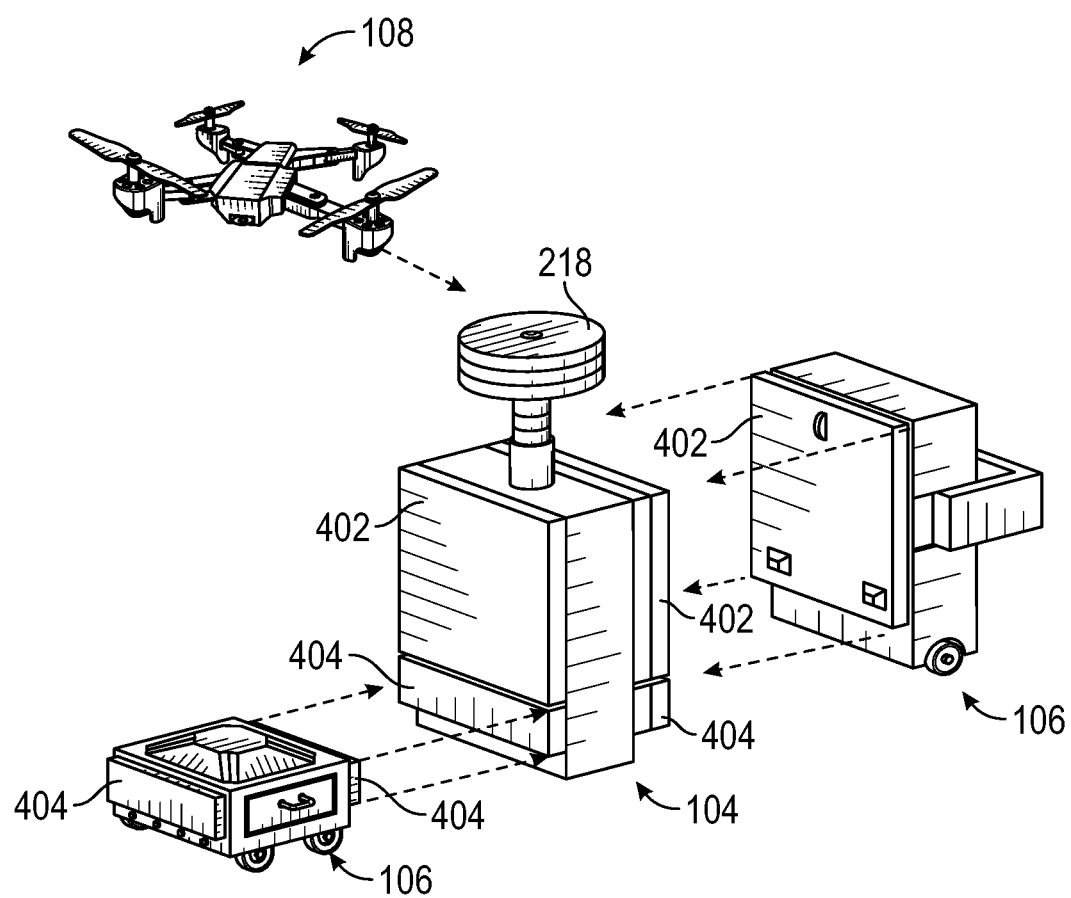
FIG. 4A depicts various types of mobile robots interacting with a battery charging station in accordance with one or more embodiments of the disclosure.

FIG. 4A provides an illustration of mobile robots 106, a modular component 205, and an unmanned aerial vehicle 108 exchanging batteries with a battery charging station 104. The battery "swapping" process depicted in FIG. 4A is disclosed in greater detail in PCT Application Serial Number PCT/US2018/042943, filed on Jul. 19, 2018, titled "Swappable Battery System", which is hereby incorporated by reference herein in its entirety including all references and appendices cited therein for all purposes. In this particular illustration, the battery charging station 104 comprises three different types of batteries, one larger battery 402 compatible with a mobile robot 106 or a modular component 205 configured to receive a larger battery 402, one smaller battery 404 compatible with a mobile robot 106 or a modular component 205 configured to receive a smaller battery 404, and one unmanned aerial vehicle battery 218 compatible with an unmanned aerial vehicle 108. The batteries provided on the battery charging station 104 are arranged in such a way as to allow easy access for their compatible mobile robots 106 or modular components 205. For example, the smaller battery 404 is located on the bottom portion of the battery charging station 104 to allow the smaller mobile robot 106 configured to receive the smaller battery 404 to traverse to the battery charging station 104 and directly align itself with the smaller battery 404. In some embodiments, the battery charging station 104 may also be configured to adjust the positioning of a battery to better align with a mobile robot 106 or a modular component 205 seeking to receive a battery. By doing so, a robot seeking to receive a battery from the battery charging station 104 would not need to perfectly align with the location of the battery in order to receive the battery. In other embodiments, the robot seeking to receive the battery may be configured to adjust its positioning to better align with a battery on the battery charging station 104. It should be noted that FIG. 4A is just one illustration of a battery charging station 104 configuration, and any number of different types of batteries may be provided on a given battery charging station 104.

Figure 4B:
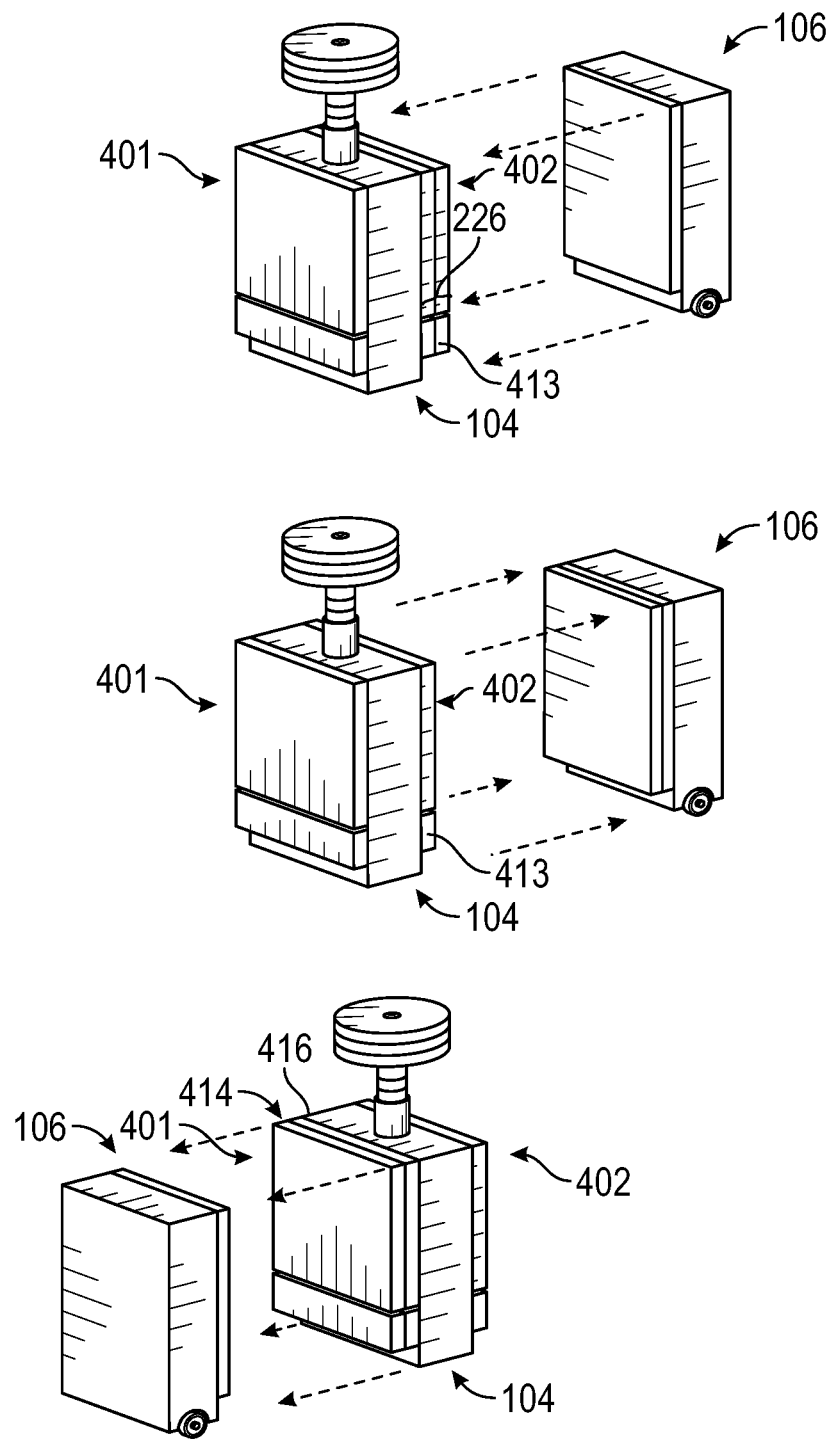
FIG. 4B depicts an example illustration of a mobile robot manipulating robot batteries on a battery charging station in accordance with one or more embodiments of the disclosure.

FIG. 4B provides an illustration of an exemplary mobile robot 106 providing and receiving robot batteries 212 to and from a battery charging station 104. The battery "swapping" process depicted in FIG. 4B is disclosed in greater detail in PCT Application Serial Number PCT/US2018/042943, filed on Jul. 19, 2018, titled "Swappable Battery System", which is hereby incorporated by reference herein in its entirety including all references and appendices cited therein for all purposes. In some embodiments, the mobile robot 106 may be configured to couple one of its robot batteries 212 to either a battery charging station port 225 or a battery stack 226 located on a first side 402 of the battery charging station 104 if a robot battery 212 is already coupled to the battery charging station port 225. The mobile robot 106 may be configured to detach the robot battery 212 from itself once the robot battery 212 is coupled to the battery charging station port 225 or a battery stack 226. The mobile robot 106 may be further configured to traverse to a second side 401 of the battery charging station 104, couple to a robot battery 212 to the battery charging station port 225 or battery stack 226 on the second side 401 of the battery charging station 104, and detach the robot battery 212 from the second side 401 of the battery charging station 104. It should be noted that although this is only a description of configurations of a mobile robot 106, any other type of robot, such as a modular component 205 or an unmanned aerial vehicle 108, could also be configured in the same manner. Further, the batteries and battery stacks described herein could also be any other type of battery such as a modular component battery 206.

Illustrative Processes

Figure 5A:
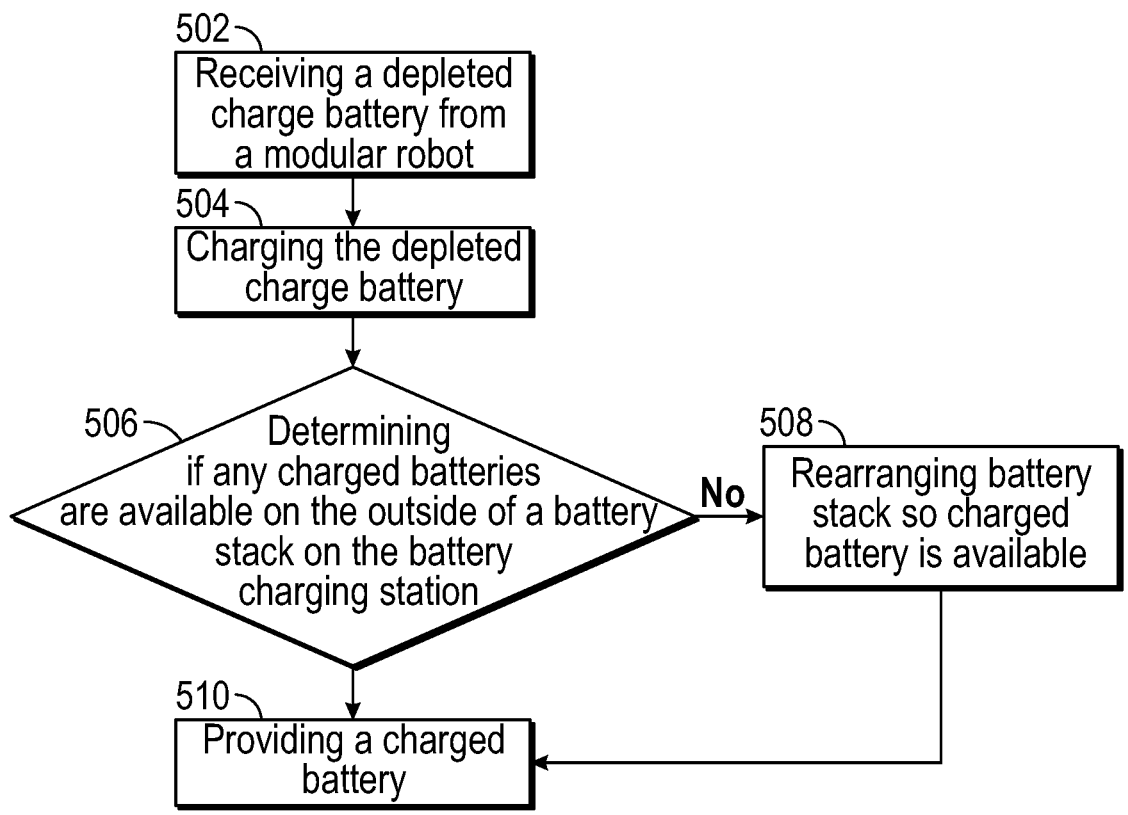
FIGS. 5A and 5B depict methods of performing battery swaps between mobile robots and battery charging stations in accordance with one or more embodiments of the disclosure.
Figure 5B:
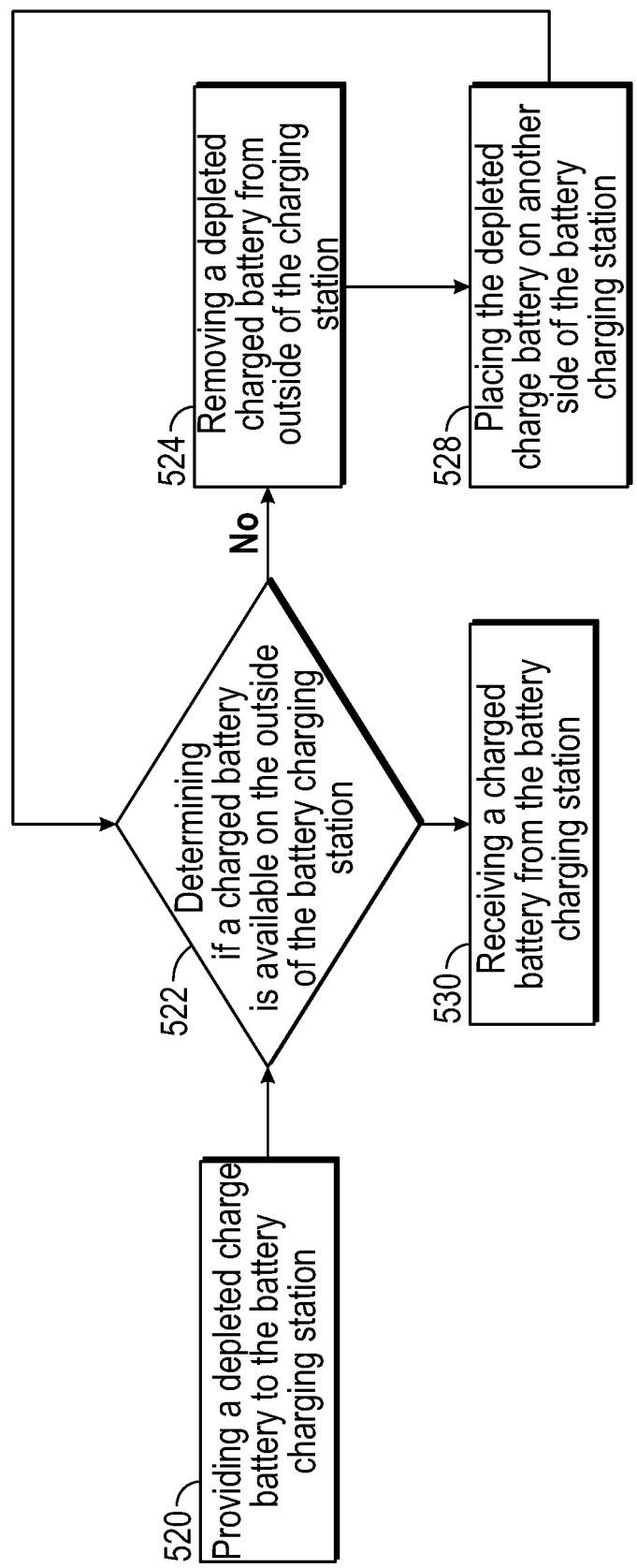

FIGS. 5A and 5B illustrate example flow diagrams showing processes for exchanging and charging robot batteries 212 between a mobile robot 106 and a battery charging station 104. The battery "swapping" methods disclosed in FIGS. 5A and 5B are disclosed in greater detail in PCT Application Serial Number PCT/US2018/042943, filed on Jul. 19, 2018, titled "Swappable Battery System", which is hereby incorporated by reference herein in its entirety including all references and appendices cited therein for all purposes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Additionally, while some of the below processes may only be described with respect to a mobile robot 106 and/or a robot battery 212, it should be noted that the same processes may apply to any other type of robot (e.g., a modular component 205) or any other type of battery (e.g., a modular component battery 206).

In one instance, as depicted in FIG. 5A, a method for exchanging robot batteries 212 between a mobile robot 106 and a battery charging station 104 may be performed by the battery charging station 104. This process is generally performed by receiving a depleted robot battery 212 from the mobile robot 106 at block 502, charging the depleted robot battery 212 at block 504, and providing a charged robot battery to the mobile robot 106 at block 510.

In some instances, a robot battery 212 is received at a battery charging station port 225 of the battery charging station 104. The robot battery 212 received at the battery charging station 104 may be a robot battery 212 with less than a full battery charge. The mobile robot battery 212 may be mechanically and/or electrically coupled to the battery charging station port 225 so as to allow the battery charging station port 225 to provide power to the robot battery 212 and vice versa. If a second mobile robot battery 413 (shown in FIG. 4B) is already coupled to the battery charging station port 225, the robot battery 212 may be coupled to the second robot battery 413, so as to form a battery stack 226 comprising multiple robot batteries 212 on the battery charging station port 225. Any of the robot batteries 212 on a battery stack 226 may be mechanically and/or electrically coupled to one another, and also mechanically and/or electrically coupled to the battery charging station port 225.

In some instances, the battery charging station 104, at block 506, may also determine whether any charged robot batteries 212 are located on the outside 414 of a battery stack 226 (if the battery charging port is coupled to multiple robot batteries 212). FIG. 4B provides an illustration of a charged battery being located on the outside 414 of a battery stack 226 versus the inside 416. If no charged robot batteries 212 are located on the outside 414 of any of the battery stacks 226, the battery charging station 104 may, at block 508, be configured to rearrange the robot batteries 212 on the battery stack 226 so that a charged robot battery 212 is available on the outside 416 of the battery stack 226. This would allow the battery charging station 104 to easily provide a charged robot battery 212 to the mobile robot 106. In other instances, the battery charging station 104 may provide a robot battery 212 that is not fully charged to the mobile robot 106 at block 510 if the robot battery 212 being provided has more charge than the robot battery 212 being received at the battery charging station 104 by the mobile robot 106.

In some instances, as depicted in FIG. 5B, the method for exchanging and charging robot batteries 212 between a mobile robot 106 and a battery charging station 104 may be performed by a mobile robot 106. This process is generally performed by providing, by the mobile robot 106, a depleted robot battery 212 to the battery charging station 104 at block 520 and receiving a charged robot battery 212 from the battery charging station 104 at block 530. The robot battery 212 provided to the battery charging station 104 by the mobile robot 106 may be a robot battery 212 with less than a full battery charge. The mobile robot 106 may provide the robot battery 212 to any one of one or more battery charging station ports 225 located on the battery charging station 104. Any of the one or more battery charging station ports 225 may be already coupled to one or more robot batteries 212 (for example, a second mobile robot battery 413), or may not be coupled to any robot batteries 212 (as depicted in FIG. 2B). If a robot battery 212 is already coupled to a given battery charging station port 225, the battery to be received may be coupled to the already coupled second mobile robot battery 413, so as to form a battery stack 226 on the given battery charging station port 225. Any of the batteries on a battery stack 226 may be mechanically and/or electrically coupled to one another, and also mechanically and/or electrically coupled to the battery charging station port 225.

In some instances, at block 522, a mobile robot 106 may determine whether a sufficiently charged robot battery 212 is available to receive on the outside 414 of any of the battery stacks 226 of the battery charging station 104. If the mobile robot 106 determines that no such battery exists, the mobile robot 106 may rearrange the robot batteries 212 on the battery charging station battery stacks 226. The mobile robot 106 may do so by removing a robot battery 212 with less than full charge from a battery stack 226 at block 524, and coupling the robot battery 212 with less than full charge to another battery charging station port 225 or battery stack 226 on the battery charging station 104 at block 528. An illustrative example of a mobile robot 106 rearranging robot batteries 212 on a battery stack 226 is depicted in the aforementioned FIG. 4B.

EXAMPLES

In some instances, the following examples may be implemented together or separately by the systems and methods described herein.

Example 1 may include a system, comprising: at least one mobile robot comprising at least one robot battery configured to be detachably coupled to the at least one mobile robot; at least one modular component comprising at least one modular component battery configured to be detachably coupled to the at least one modular component, wherein the at least one modular component is configured to be detachably coupled to the at least one mobile robot; at least one battery charging station disposed within a geographic area, wherein the at least one battery charging station is configured to receive the at least one robot battery from the at least one mobile robot and the at least one modular component battery from the at least one modular component, and wherein the at least one battery charging station is configured to provide the at least one robot battery to the at least one mobile robot and the at least one modular component battery to the at least one modular component.

Example 2 may include the system of example 1, wherein the at least one modular component battery and the at least one robot battery are configured to provide power to the at least one mobile robot and/or the at least one modular component.

Example 3 may include the system of example 2 and/or some other example herein, wherein the at least one modular component battery and the at least one mobile robot are different dimensions.

Example 4 may include the system of example 1 and/or some other example herein, wherein the at least one battery charging station comprises at least one battery charging port.

Example 5 may include the system of example 4 and/or some other example herein, wherein the at least one battery charging port comprises one or more mechanical and/or electrical connections compatible with the at least one robot battery and/or the at least one modular component battery.

Example 6 may include the system of example 4 and/or some other example herein, wherein the at least one battery charging port is configured to provide power to the at least one robot battery and/or the at least one modular component battery to charge the at least one robot battery and/or the at least one modular component battery.

Example 7 may include the system of example 4 and/or some other example herein, wherein the at least one battery charging port is configured to simultaneously receive and charge multiple robot batteries and/or multiple modular component batteries.

Example 8 may include the system of example 1 and/or some other example herein, wherein the at least one battery charging station further comprises at least one of a light-emitting device, an informational display, and/or a camera.

Example 9 may include a system, comprising: at least one mobile robot comprising at least one robot battery configured to be detachably coupled to the at least one mobile robot; at least one modular component comprising at least one modular component battery configured to be detachably coupled to the at least one modular component, wherein the at least one modular component is configured to be detachably coupled to the at least one mobile robot; at least one unmanned aerial vehicle comprising at least one unmanned aerial vehicle battery configured to be detachably coupled to the unmanned aerial vehicle; at least one battery charging station disposed within a geographic area, wherein the at least one battery charging station is configured to receive the at least one robot battery from the at least one mobile robot, the at least one modular component battery from the modular component, and the at least one unmanned aerial vehicle battery from the at least one unmanned aerial vehicle, wherein the at least one battery charging station is further configured to provide the at least one robot battery to the at least one mobile robot, the at least one modular component battery to the modular component, and the at least one unmanned aerial vehicle battery to the at least one unmanned aerial vehicle.

Example 10 may include the system of example 9, wherein the at least one battery charging port is configured to provide power to the at least one robot battery, the at least one modular component battery, and/or the at least one unmanned aerial vehicle battery to charge the at least one robot battery, the at least one modular component battery, and/or the at least one unmanned aerial vehicle battery.

Example 11 may include the system of example 9 and/or some other example herein, wherein the at least one battery charging port is configured to simultaneously receive and charge multiple robot batteries, multiple modular component batteries, and/or multiple unmanned aerial vehicle batteries.

Example 12 may include the system of example 9 and/or some other example herein, wherein the at least one battery charging station further comprises at least one of a light-emitting device, an informational display, and/or a camera.

Example 13 may include a method, comprising: receiving, at a battery charging station, a first robot battery from a mobile robot, or a first modular component battery from a modular component, wherein the first robot battery and/or the first modular component battery comprise a battery charge that is less than a full charge; providing, through the battery charging station, power to the first robot battery and/or the first modular component battery, wherein the provided power charges the first robot battery and/or the first modular component battery; and providing, from the battery charging station, either the first robot battery or a second robot battery, and/or the first modular component battery or a second modular component battery, to a mobile robot and/or a modular component, wherein the first robot battery or the second robot battery and/or the first modular component battery or the second modular component battery are either partially or fully charged.

Example 14 may include the method of example 13, wherein both the at least one modular component battery and the first robot battery or the second robot battery are configured to provide power to the mobile robot and/or the modular component.

Example 15 may include the method of example 13 and/or some other example herein, wherein the at least one modular component battery is sized according to the size of the modular component and the first robot battery or the second robot battery is sized according to the size of the mobile robot.

Example 16 may include the method of example 13 and/or some other example herein, wherein the robot battery received and/or provided by the battery charging station is the at least one modular component battery.

Example 17 may include the method of example 16 and/or some other example herein, further comprising: determining, by the battery charging station, if a robot battery and/or a modular component battery comprising a full charge is directly accessible by the mobile robot and/or the modular component; and reconfiguring, by the battery charging station, the arrangement of the robot batteries, so that a robot battery and/or a modular component battery of full battery charge is directly accessible by the mobile robot and/or the modular component, wherein the reconfiguration is performed at least based on the determination that no robot battery and/or modular component battery comprising a full charge is directly accessible by the mobile robot and/or the modular component.

Example 18 may include the method of example 13 and/or some other example herein, comprising determining if a robot battery and/or modular component battery of full charge has been coupled to the mobile robot and/or a modular component.

Example 19 may include the method of example 18 and/or some other example herein, further comprising decoupling the robot battery and/or modular component battery from the battery charging station and providing the robot battery and/or modular component battery to the mobile robot upon determination that the robot battery is coupled to the mobile robot.

Example 20 may include the method of example 13 and/or some other example herein, comprising adjusting the orientation of the robot battery and/or modular component battery based on the location of the mobile robot and/or the modular component relative to the robot battery.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   at least one mobile robot comprising at least one robot battery configured to be detachably coupled to the at least one mobile robot;
   at least one modular component comprising at least one modular component battery configured to be detachably coupled to the at least one modular component, wherein the at least one modular component is configured to be detachably coupled to the at least one mobile robot; and
   at least one battery charging station disposed within a geographic area, wherein the at least one battery charging station is configured to receive the at least one robot battery from the at least one mobile robot and the at least one modular component battery from the at least one modular component, and wherein the at least one battery charging station is configured to provide the at least one robot battery to the at least one mobile robot and the at least one modular component battery to the at least one modular component,
   wherein the at least one battery charging station comprises at least one battery charging port, and
   wherein the at least one battery charging port is configured to simultaneously receive and charge multiple robot batteries and/or multiple modular component batteries.

2. The system of claim 1, wherein the at least one modular component battery and the at least one robot battery are configured to provide power to the at least one mobile robot and/or the at least one modular component.

3. The system of claim 2, wherein the at least one modular component battery and the at least one mobile robot are different dimensions.

4. The system of claim 1, wherein the at least one battery charging port comprises one or more mechanical and/or electrical connections compatible with the at least one robot battery and/or the at least one modular component battery.

5. The system of claim 1, wherein the at least one battery charging port is configured to provide power to the at least one robot battery and/or the at least one modular component battery to charge the at least one robot battery and/or the at least one modular component battery.

6. The system of claim 1, wherein the at least one battery charging station further comprises at least one of a light-emitting device, an informational display, and/or a camera.

7. A system, comprising:
- at least one mobile robot comprising at least one robot battery configured to be detachably coupled to the at least one mobile robot;
- at least one modular component comprising at least one modular component battery configured to be detachably coupled to the at least one modular component, wherein the at least one modular component is configured to be detachably coupled to the at least one mobile robot;
- at least one unmanned aerial vehicle comprising at least one unmanned aerial vehicle battery configured to be detachably coupled to the unmanned aerial vehicle; and
- at least one battery charging station disposed within a geographic area, wherein the at least one battery charging station is configured to receive the at least one robot battery from the at least one mobile robot, the at least one modular component battery from the modular component, and the at least one unmanned aerial vehicle battery from the at least one unmanned aerial vehicle, wherein the at least one battery charging station is further configured to provide the at least one robot battery to the at least one mobile robot, the at least one modular component battery to the modular component, and the at least one unmanned aerial vehicle battery to the at least one unmanned aerial vehicle.

8. The system of claim 7, wherein the at least one battery charging port is configured to provide power to the at least one robot battery, the at least one modular component battery, and/or the at least one unmanned aerial vehicle battery to charge the at least one robot battery, the at least one modular component battery, and/or the at least one unmanned aerial vehicle battery.

9. The system of claim 7, wherein the at least one battery charging port is configured to simultaneously receive and charge multiple robot batteries, multiple modular component batteries, and/or multiple unmanned aerial vehicle batteries.

10. The system of claim 7, wherein the at least one battery charging station further comprises at least one of a light-emitting device, an informational display, and/or a camera.

11. A method, comprising:
- receiving, at a battery charging station, a first robot battery from a mobile robot, or a first modular component battery from a modular component, wherein the first robot battery and/or the first modular component battery comprise a battery charge that is less than a full charge;
- providing, through the battery charging station, power to the first robot battery and/or the first modular component battery, wherein the provided power charges the first robot battery and/or the first modular component battery;
- providing, from the battery charging station, either the first robot battery or a second robot battery, and/or the first modular component battery or a second modular component battery, to a mobile robot and/or a modular component, wherein the first robot battery or the second robot battery and/or the first modular component battery or the second modular component battery are either partially or fully charged, wherein the first or second robot battery received and/or provided by the battery charging station is the at least one modular component battery;
- determining, by the battery charging station, if a robot battery and/or a modular component battery comprising a full charge is directly accessible by the mobile robot and/or the modular component; and
- reconfiguring, by the battery charging station, the arrangement of the robot batteries, so that a robot battery and/or a modular component battery of full battery charge is directly accessible by the mobile robot and/or the modular component, wherein the reconfiguration is performed at least based on the determination that no robot battery and/or modular component battery comprising a full charge is directly accessible by the mobile robot and/or the modular component.

12. The method of claim 11, wherein both the at least one modular component battery and the first robot battery or the second robot battery are configured to provide power to the mobile robot and/or the modular component.

13. The method of claim 11, wherein the at least one modular component battery is sized according to the size of the modular component and the first robot battery or the second robot battery is sized according to the size of the mobile robot.

14. The method of claim 11, comprising determining if a robot battery and/or modular component battery of full charge has been coupled to the mobile robot and/or a modular component.

15. The method of claim 14, further comprising decoupling the robot battery and/or modular component battery from the battery charging station and providing the robot battery and/or modular component battery to the mobile robot upon determination that the robot battery is coupled to the mobile robot.

16. The method of claim 11, comprising adjusting the orientation of the robot battery and/or modular component battery based on the location of the mobile robot and/or the modular component relative to the robot battery.

* * * * *